(12) United States Patent
Kusaka et al.

(10) Patent No.: US 9,348,140 B2
(45) Date of Patent: May 24, 2016

(54) VIRTUAL IMAGE DISPLAY DEVICE

(71) Applicant: Hitachi-LG Data Storage, Inc., Tokyo (JP)

(72) Inventors: Hiromi Kusaka, Tokyo (JP); Satoshi Ouchi, Tokyo (JP); Yoshiho Seo, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 30 days.

(21) Appl. No.: 14/187,469

(22) Filed: Feb. 24, 2014

(65) Prior Publication Data

US 2014/0268358 A1 Sep. 18, 2014

(30) Foreign Application Priority Data

Mar. 13, 2013 (JP) ................... 2013-049868

(51) Int. Cl.

| | |
|---|---|
| *G02B 27/14* | (2006.01) |
| *G09G 5/00* | (2006.01) |
| *G02B 27/01* | (2006.01) |
| *G02B 5/02* | (2006.01) |
| *G02B 5/32* | (2006.01) |

(52) U.S. Cl.
CPC .......... *G02B 27/0101* (2013.01); *G02B 5/0278* (2013.01); *G02B 27/01* (2013.01); *G02B 27/0103* (2013.01); *G02B 27/017* (2013.01); *G02B 5/0242* (2013.01); *G02B 5/0257* (2013.01); *G02B 5/32* (2013.01); *G02B 27/0172* (2013.01); *G02B 2027/011* (2013.01); *G02B 2027/0118* (2013.01)

(58) Field of Classification Search
CPC ............... G02B 27/01; G02B 27/0101; G02B 27/0103; G02B 27/017; G02B 27/0172; G02B 27/14; G02B 2027/011; G02B 2027/0118; G02B 2027/0121; G03B 21/28
USPC ................. 359/629–631, 633, 634, 639, 640; 345/7–9; 353/7, 13, 14, 20, 31, 38, 77; 348/771, E5.142, E5.143
See application file for complete search history.

(56) References Cited

U.S. PATENT DOCUMENTS

| | | | | |
|---|---|---|---|---|
| 4,967,191 A | * | 10/1990 | Iino | .................................. 345/7 |
| 5,066,117 A | * | 11/1991 | Matsumura | .................... 351/226 |
| 5,943,171 A | * | 8/1999 | Budd et al. | ..................... 359/631 |

(Continued)

FOREIGN PATENT DOCUMENTS

| | | |
|---|---|---|
| JP | 2004-020605 | 1/2004 |
| JP | 2010-197493 | 9/2010 |

*Primary Examiner* — Loha Ben
(74) *Attorney, Agent, or Firm* — Baker Botts L.L.P.

(57) ABSTRACT

A virtual image display device includes: an image projection device that projects an image light; a diverging element on which the image light emitted from the image projection device is incident, spreading the image light out over a range of a predetermined angle; and a light branching element that reflects the image light emitted from the diverging element, while transmitting the incident light from the surface other than the reflecting surface. The image light from the image projection device is formed into an image on the diverging element. A virtual image of the image formed on the diverging element is generated on an extension line in the opposite direction to the emission direction of the image light reflected from the light branching element. Further, an optical axis converting element is provided to convert the optical axis of the image light emitted from the image projection device, into a predetermined direction.

18 Claims, 9 Drawing Sheets

(56) References Cited

U.S. PATENT DOCUMENTS

| | | |
|---|---|---|
| 6,359,737 B1 * | 3/2002 | Stringfellow ................. 359/631 |
| 6,443,573 B2 * | 9/2002 | Aoki ............................... 353/13 |
| 6,504,518 B1 * | 1/2003 | Kuwayama et al. .............. 345/7 |
| 7,158,095 B2 * | 1/2007 | Jenson et al. ..................... 345/7 |
| 7,522,344 B1 * | 4/2009 | Curatu et al. ................. 359/634 |
| 8,289,229 B2 * | 10/2012 | Ishikawa et al. .................. 345/7 |
| 8,576,491 B2 * | 11/2013 | Takagi et al. ................. 359/633 |
| 8,770,760 B2 * | 7/2014 | Sawai ............................. 353/20 |

* cited by examiner

VIRTUAL IMAGE DISPLAY DEVICE

CROSS-REFERENCE TO RELATED APPLICATION

This application claims the Japanese Patent Application No. 2013-049868 filed Mar. 13, 2013, which is incorporated herein by reference in its entirety.

BACKGROUND

The present invention relates to a structure of a display device that allows users to view virtual images.

Augmented reality (hereinafter, AR) is a technology that overlays image information on a real space. In recent years, the AR technology has been drawing attention in the fields of entertainment and work support system. A means for achieving the AR is a display device that generates a virtual image by reflecting an optically generated image on the user side by using an optical branching element, overlays the virtual image on a real space, and displays the virtual image to the user. In particular, the AR display device installed in the plane or vehicle is referred to as a head up display (hereinafter, HUD). HUD displays speed and the like to reduce the visual line movement of the operator, contributing to safe driving.

The technology of a display device for providing such a virtual image is disclosed in Patent document 1 (Japanese Unexamined Patent Application Publication No. 2004-20605) and Patent document 2 (Japanese Unexamined Patent Application Publication No. 2010-197493).

More specifically, Patent document 1 describes a head up display that provides a virtual image by reflecting a real image on a display unit by a concave mirror, and by reflecting a display light by a windshield. Patent document 1 discloses a technology for downsizing by providing a prism sheet in the optical path from the concave mirror to the windshield.

Further, Patent document 2 discloses a technology that allows virtual images to be visible from different viewpoints, by providing a movement mechanism to adjust the incident angle of an image light projected from the optical unit to the windshield, and a lens optical system to correct the distortion of the image projected on the windshield.

SUMMARY

In HUD, the position where the virtual image can be observed is referred to as an observation point, and the range where the virtual image can be observed when the observation point is moved is referred to as an observation range. In the case of in-car HUD, in general, the generation range of the image in the view of the observer is such that the vertical dimension is smaller than the horizontal dimension. Also in the observation range, the vertical dimension is narrower than the horizontal dimension.

Further, in the case of in-car HUD, in order to observe the image overlaid on a bright real space such as daytime outdoor, the brightness of the virtual image must be higher than the brightness of the real space. Thus, highly energy efficient light must be projected as much as possible in order to increase the brightness of the virtual image.

Further, in the case of in-car HUD, the observation range may vary due to the body type of the observer. Thus, it is desirable that the HUD has a mechanism that can adjust the observation range vertically according to the body type of the observer, and has a wide observation range to cover the estimated range of the observer.

In the technology disclosed in Patent document 1, the in-car HUD can be downsized but the observation range is not taken into account. Further, in the technology disclosed in Patent document 2, there is no description of the brightness of the virtual image.

An object of the present invention is to address the above problems and provide a HUD with a wide observation range and allowing a highly bright virtual image to be viewed.

In order to address the above problems, a virtual image display device according to an aspect of the present invention includes: an image projection device that projects an image light; a diverging element on which the image light emitted from the image projection device is incident, spreading the image light out over a range of a predetermined angle; and a light branching element that reflects the image light emitted from the diverging element, while transmitting the incident light from the surface other than the reflecting surface. The image light from the image projection device is formed into an image on the diverging element. Then, a virtual image of the image formed on the diverging element is generated on an extension line in the opposite direction to the emission direction of the image light reflected from the light branching element. It is possible to adjust the observation range by adjusting the divergence angle of the diverging element.

Further, a virtual image display device according to another aspect of the present invention includes an optical axis converting element that converts the optical axis of the image light emitted from the image projection device, into a predetermined direction. In this way, it is possible to adjust the position of the observation range and prevent the reduction of the brightness of the virtual image.

According to the aspects of the present invention, it is possible to provide a virtual image display device with a wide observation range, allowing users to view high brightness virtual images.

DETAILED DESCRIPTION

Hereinafter, embodiments of the present invention will be described in detail with reference to the accompanying drawings.

First Embodiment

Figure 1:
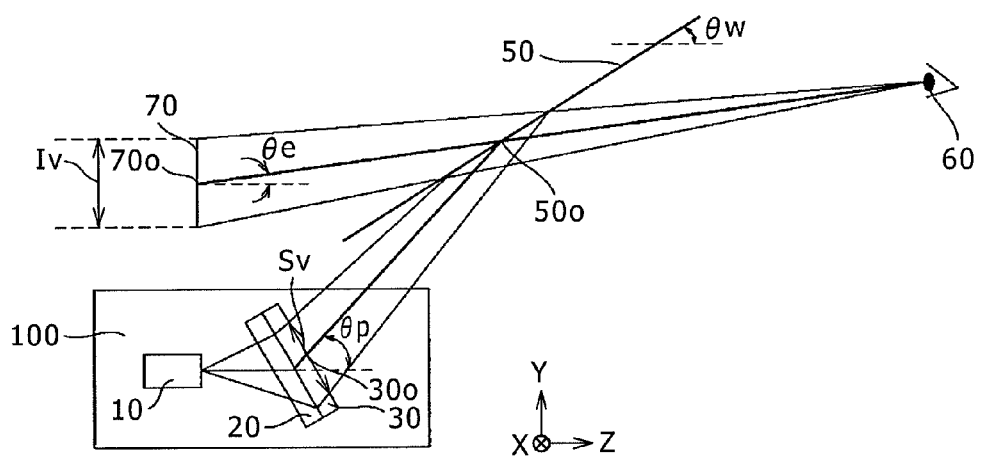
FIG. 1 is a view schematically showing a virtual image display device according to a first embodiment.

FIG. 1 is a view schematically showing a virtual image display device according to the embodiment. The figure shows the cross-sectional structure perpendicular to the ground, in which the y-axis direction is the direction perpendicular to the ground, and the surface along the x and z axes is parallel to the ground. When the virtual image display device according to the present embodiment is applied to in-car HUD, the vertical direction of the observation range corresponds to the y-axis direction, and the horizontal direction of the observation range corresponds to the x-axis direction.

A body 100 of the virtual image display device includes an image projection device 10, an optical axis converting element 20, and a diverging element 30. Here, the image light emitted from the image projection device 10 passes through the optical axis converting element 20, and forms an image of a predetermined size on the diverging element 30. At this time, it is assumed that Sv is the size on the side of the image projected on the diverging element 30, and the point 30o is the central position of the image. As shown in the figure, the image projection device 10 is provided parallel to the bottom of the body 100. The image projection device 10 projects the image in the z direction in the figure.

For example, the image projection device 10 used here is a device for two-dimensional scanning of laser beam on the diverging element 30 by a small mirror such as MEMS, or a small projector with an LED (light emitting diode) light source that modulates the intensity of light by a small mirror called DMD (Digital Micromirror Device) to form an image on the diverging element by a projection lens.

The optical axis converting element 20 has a function to bend the light emitted in the z axis direction from the image projection device 10, into the $\theta p$ direction in the figure. Further, the optical axis converting element 20 is designed to rotate around the x axis in the figure as a rotation axis to adjust the position of the virtual image.

The diverging element 30 spreads light out at different angles in the parallel and vertical directions to the paper. The light spread out by the diverging element 30 reaches the light branching element 50 provided outside the body 100.

The light branching element 50 is a semi-transmissive mirror that reflects a predetermined power while transmitting the other remaining power. For example, the light branching element 50 may be formed of glass or plastic, and may be a car windshield. The light branching element 50 is provided to reflect light on the user side.

As shown in FIG. 1, the light emitted from the point 30o on the diverging element 30 is reflected from the point 50o on the light branching element 50 to reach the observation point 60. When viewed from the observation point 60, the point 30o is observed to be the same as the point 70o on the line connecting the observation point 60 and the point 50o. The other light projected on the diverging element 30 also reaches the observation point 60 through the same optical path. As a result, a real image centered on the point 30o on the diverging element 30 is observed as a virtual image 70 centered on 70o with the same size Iv as the image size Sv, from the observation point 60.

The next describes the relationship between beam angles at this time. The angle $\theta w$ is the angle of the rotation in the direction from the z axis to the y axis, around the x axis of the light branching element 50. Similarly, the angle $\theta e$ is the angle of the beam connecting the observation point 60 and the point 70o which is the center of the virtual image 70. For example, assuming the case of installation in a car, the angle $\theta w$ corresponds to the angle of the windshield, and the angle $\theta e$ corresponds to a predetermined position of the virtual image.

Here, the predetermined position of the virtual image is the position where the user does not feel discomfort in driving, such as, for example, the position where the user can view by moving the eyes slightly down. As described above, the angles $\theta w$ and $\theta e$ are typically determined by the device including the virtual image display device according to the present embodiment.

The angle $\theta p$ must be $\theta p=2\times\theta w-\theta e$ due to the relationship of the reflection of light on the light branching element 50. The optical axis converting element 20 according to the present embodiment is designed to bend the optical axis of the light emitted from the image projection device 10 in the z axis direction at the angle of $\theta p=2\times\theta w-\theta e$, according to predetermined angles $\theta w$ and $\theta e$.

Next, the function of the diverging element 30 will be described with reference to FIGS. 2 and 3.

As described above, the diverging element 30 has the function to spread the incident light out at different angles in the parallel and vertical directions to the paper. In this way, the diverging element 30 adjusts the size and shape of the observation range where the observer views.

Figure 2:
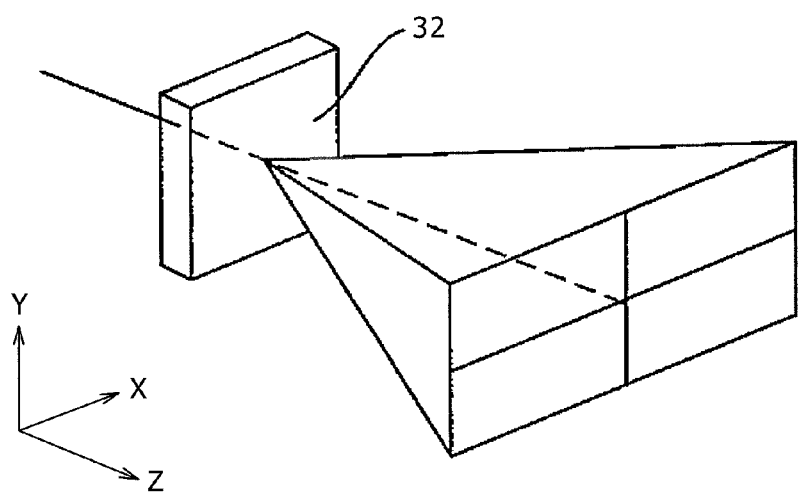
FIG. 2 is a view of the function of a diverging element 32.
Figure 3:
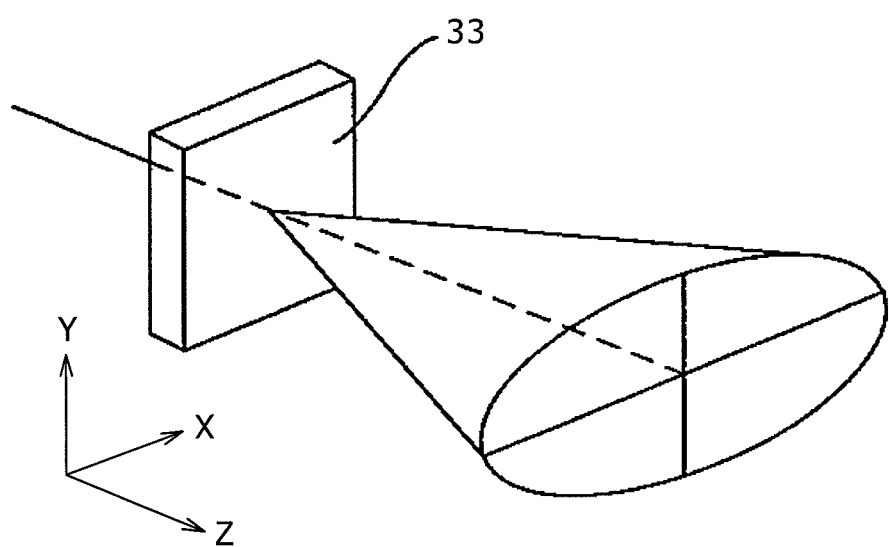
FIG. 3 is a view of the function of a diverging element 33.

For example, the diverging element 30 is the element for emitting the divergent light in the direction of a rectangular shape as shown in FIG. 2, or the element for emitting the divergent light in the direction of an elliptical shape as shown in FIG. 3. The diverging elements 32 and 33 can be realized, for example, by a micro-lens array with different focal lengths in the x and y directions in the figure, a Fresnel element, a holographic element, and a bead diffuser with different particle densities in the x and y directions.

Figure 4:
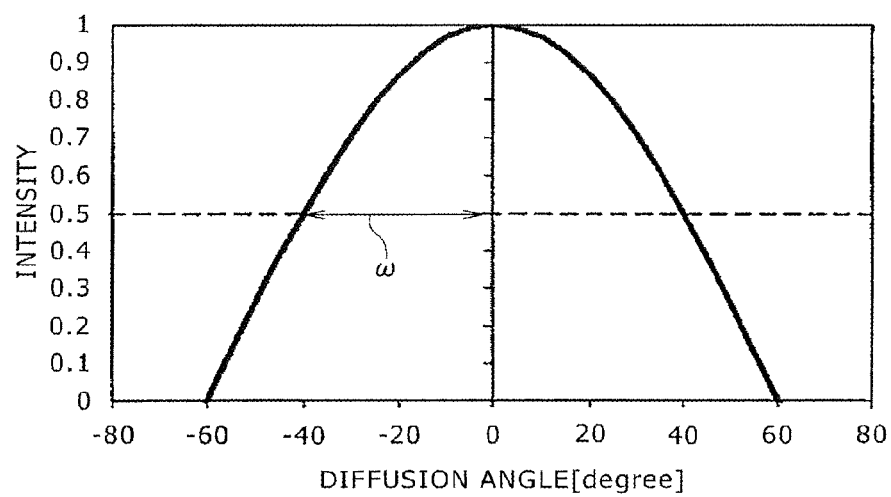
FIG. 4 is a view of the directivity of the beam after passing through the diverging element 30.

FIG. 4 is a view of the directivity of the beam emitted from the diverging element 30. The horizontal axis represents the divergence angle, and the vertical axis represents the light intensity normalized by the light intensity passing at 0 degrees. For example, FIG. 4 corresponds to the case where the diverging element 30 is formed by a micro-lens array, and the like. The intensity of the light emitted from the diverging element is the maximum when the divergence angle is 0 degrees. The light intensity is small as the divergence angle increases. In the present embodiment, the divergence angle $\omega$ is defined as the angle at which the light intensity is approximately half the central intensity at a divergence angle of 0 degrees.

Next, the relationship between the observation range D and the divergence angle $\omega$ of the diverging element 30 will be described with reference to FIGS. 5 and 6. In the figures, the suffixes of the observation range D and the divergence angle $\omega$ are as follows: h indicates the direction parallel to a line connecting two observation points corresponding to the right and left eyes of the user, and v indicates the direction perpendicular to the line.

Figure 5:
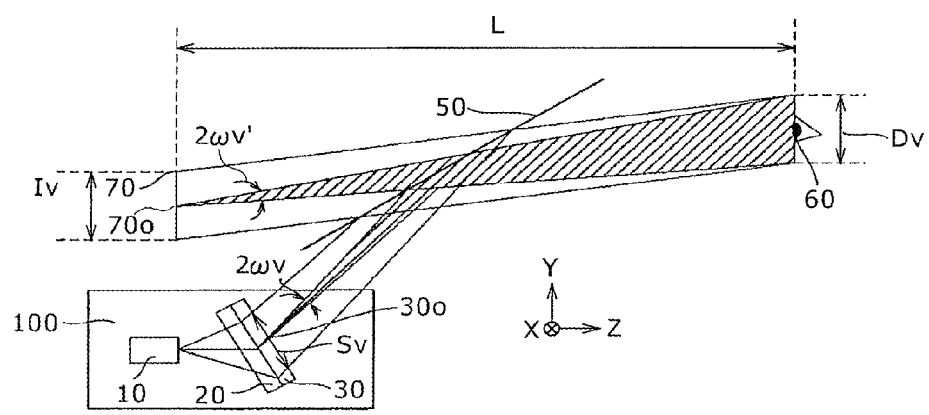
FIG. 5 is a view of the relationship between the size of the observation range in the direction parallel to the y axis, and the divergence angle.

FIG. 5 is a view of the relationship between the size of the observation range in the direction parallel to the y axis, and the divergence angle in the virtual image display device according to the first embodiment.

As shown in the figure, a predetermined range centered on the observation point 60 is defined as the observation range Dv, the distance between the observation point 60 and the virtual image 70 is defined as the distance L, the divergence angle formed from the point 70o, which is the center of the virtual image, to the observation range Dv is defined as ωv', and the divergence angle of the light passing through the point 30o of the diverging element 30 is defined as ωv. Here it is also assumed that the divergence angles ωv' and ωv are the intensity that is approximately half the maximum intensity. The figure shows the diffusion range with the size of 2ωv', 2ωv.

In order to observe the point 70o which is the center of the virtual image 70 in the entire observation range Dv, it is necessary to satisfy the following relationship between the virtual image point 70o and the observation range Dv.

From the figure, the relationship between the divergence angle ωv' and the observation range Dv, as well as the distance L can be expressed as Equation 1. More specifically, the distance L can be considered as the optical path length from the observation point to the virtual image.

$$\omega V' = \tan^{-1}(Dv/2/L) \quad (1)$$

If the divergence angle ωv'=tan$^{-1}$(Dv/2/L), the point 70o of the virtual image 70 can be observed in the entire observation range Dv.

Since the divergence angle ωv' is the angle at which the intensity is approximately half the maximum value, the intensity of the light incident on both ends of the observation range Dv is also approximately half. Thus, the brightness of the virtual image 70 observed from both ends of the observation range Dv is approximately half the maximum value. However, it is enough that the brightness observed at both ends of the observation range Dv is approximately half or more the maximum value. The observation range Dv may be smaller than the divergence angle ωv, namely, ωv'<=tan$^{-1}$(Dv/2/L).

The divergence angle ωh' of the point 70o can be adjusted to a predetermined angle by adjusting the divergence angle of the point 30o which is the conjugate of the point 70o. Thus, the diverging element 30 according to the present embodiment is such that the divergence angle ωv is ωv<=tan$^{-1}$(Dh/2/L).

Similarly, the observation range 60 in the horizontal direction will be described with reference to FIG. 6.

Figure 6:
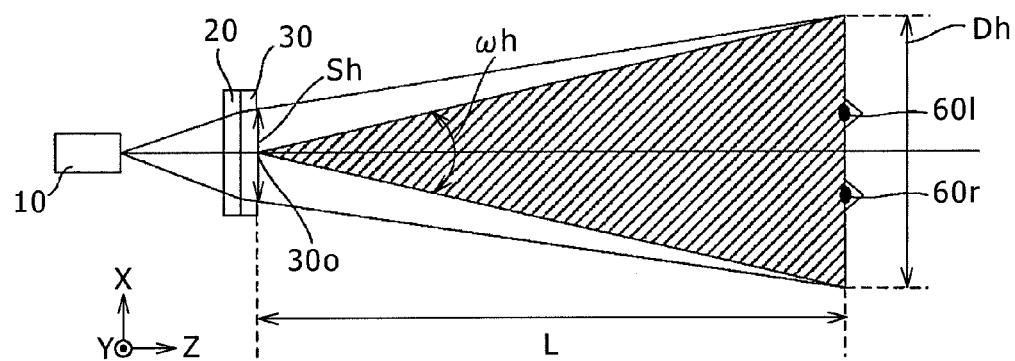
FIG. 6 is a view of the relationship between the size of the observation range in the direction parallel to the x axis, and the divergence angle.

FIG. 6 is a plan view of the display device according to the first embodiment, showing the relationship between the size of the observation range in the direction parallel to the x axis, and the divergence angle. Note that it is assumed that the x axis is the direction parallel to two observation points of the user.

As shown in the figure, there are two observation points 60r and 60l in the observation range Dh, corresponding to the right eye and the left eye.

The divergence angle in the direction from the point 70o, which is the center of the virtual image, to the xz plane in the figure is defined as ωh'. The divergence angle of the point 30o of the diverging element 30 is defined as ωh. Here, it is also assumed that the divergence angles ωh' and ωh are the angles at which the intensity is approximately half the maximum intensity. To simplify the figure, the virtual image 70 and the divergence angle ωh' are omitted.

In order to observe the point 70o (not shown), which is the center of the virtual image, in the entire observation range Dh, the light emitted from the point 70o of the virtual image must pass through the entire observation range Dh. Using the observation range Dh and the distance L, the relationship for the divergent angle ωh' is given as ωh'=tan$^{-1}$(Dh/2/L). Similar to the angle ωv', it is enough that ωh'<=tan$^{-1}$(Dh/2/L) in order to observe the virtual image 70 while keeping the brightness approximately half or more the maximum value on both ends of the virtual image range Dh.

The divergence angle ωh' is adjusted to a predetermined angle by adjusting the divergence angle of the point 30o which is the conjugate of the point 70o. In other words, the diverging element 30 according to the present embodiment is such that the divergence angle ωh in the xz plane in the figure is ωh<=tan$^{-1}$(Dh/2/L).

As described above, the diverging element 30 can spread light out over a wider area in the x direction than in the y direction in the figure. The divergence angle ωh corresponds to a predetermined angle in the x direction, and the divergence angle ωv corresponds to the divergence angle in the y direction, which are given by the following equations: ωh<=tan$^{-1}$(Dh/2/L) and ωv<=tan$^{-1}$(Dv/2/L).

Here, the size of the observation ranges Dv and Dh, as well as the brightness of the virtual image 70 observed from the observation point 60 will be described.

In general, the movement range of the head of the user is smaller in the direction parallel to the ground than perpendicular to it. In addition, there are two observation points in the direction parallel to the ground, but one in the vertical direction. The observation range Dv can cover the movement range of the user if the range is smaller than the observation range Dh.

It is well known that the brightness of the virtual image is inversely proportional to the divergence angle.

In order to observe the virtual image in the entire observation range, the light is spread out beyond the observation range. However, if the light is spread over more than required, the light density in the observation range is reduced and the brightness of the virtual image is reduced.

When the divergence angle of the virtual image is optimized according to the observation range, it is possible to effectively take light in the observation range. As described above, the divergence angles ωv', ωh', and the observation ranges Dv, Dh are approximately proportional to each other. According to the present invention, the divergence angles ωv, ωh of the diverging element 30 are determined based on the observation ranges Dv, Dh and on the distance L between the virtual image 70 and the observation point 60, according to the installation condition of the virtual image display device. In this way, the divergence angles ωv', ωh' are optimized to increase the efficiency of the light. As a result, a high brightness virtual image can be displayed.

Next, the optical axis converting element 20 will be described in detail below.

Figure 7:
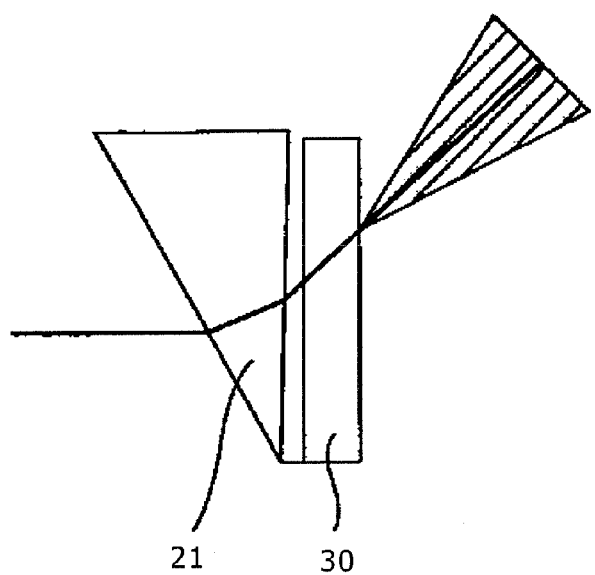
FIG. 7 is a view of the structure of an optical axis converting element 21.
Figure 8:
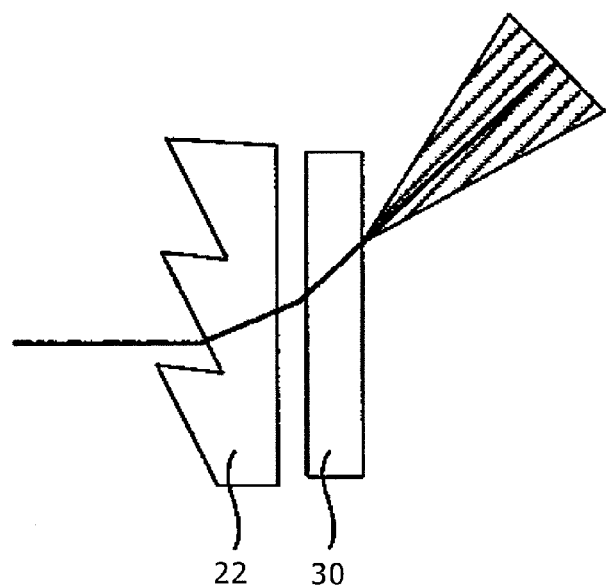
FIG. 8 is view of the structure of an optical axis converting element 22.
Figure 9:
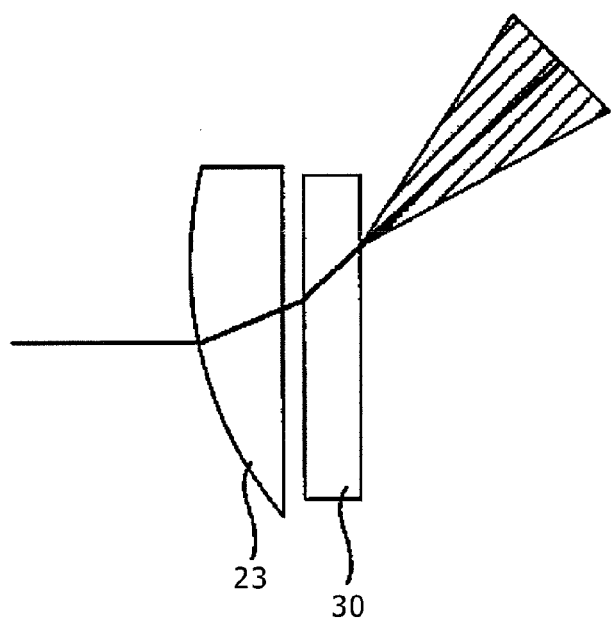
FIG. 9 is a view of the structure of an optical axis converting element 23.
Figure 10:
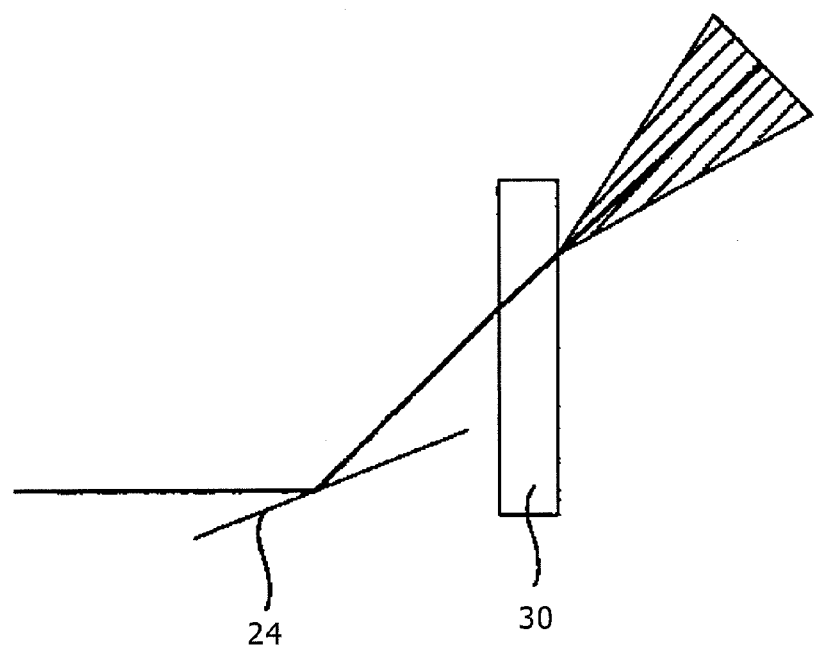
FIG. 10 is a view of the structure of an optical axis converting element 24.

The optical axis converting element 20 has a function to bend the optical axis in a predetermined direction. For example, the optical axis converting element 20 includes one prism 21 shown in FIG. 7, a prism plate 22 shown in FIG. 8, a lens 23 shown in FIG. 9, and a mirror 24 shown in FIG. 10, and the like.

When the virtual image display device according to the present embodiment is installed in a car or other vehicle, the position of the observation range Dv and angle θe appropriate for the observation of the virtual image 70 vary according to the body type of the user. Thus, it is desirable that the position of the observation range Dv and the angle θe can be adjusted by adjusting the optical axis converting element 20, which will be described in detail below.

Figure 11:
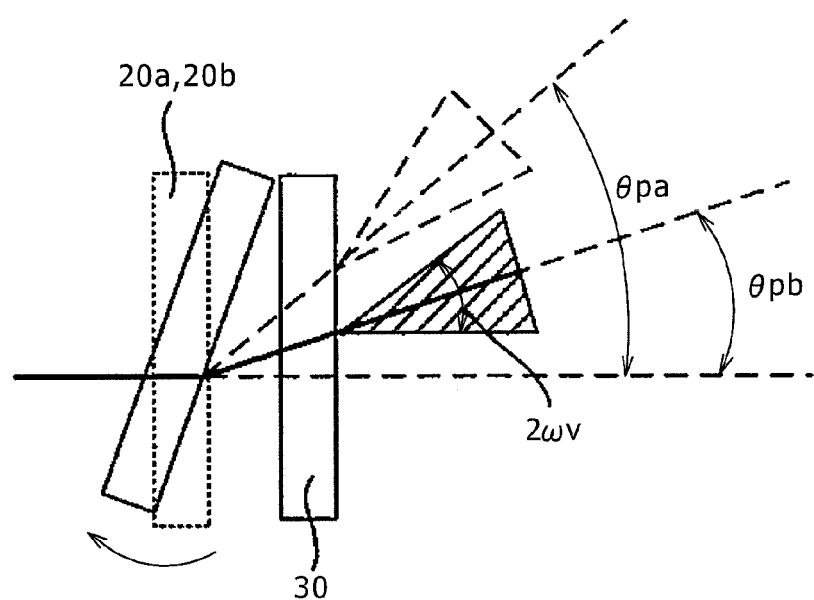
FIG. 11 is a view of the relationship between the drive of the optical axis converting element 20, and the change of the optical axis.
Figure 12:
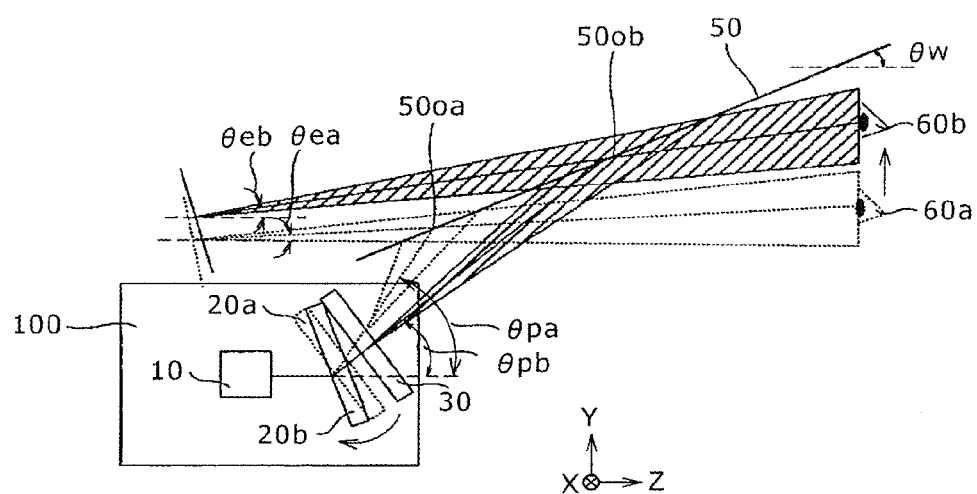
FIG. 12 is a view of the relationship between the optical axis converting element 20 and the angle θp, as well as the position of the observation range Dv.

The adjustment of the observation range Dv and the angle θe will be described with reference to FIGS. 11 and 12. FIG. 11 is a view of the relationship between the drive of the optical axis converting element 20 and the change of the optical axis. In FIG. 11, only the optical axis converting element 20 and the diverging element 30 in the display device shown in FIG. 1 are extracted, and the other parts are omitted. Further, FIG. 12 is a view of the relationship between the optical axis converting element 20 and the angle θp, as well as the position of the observation range Dv.

As shown in FIG. 11, the optical axis converting element 20 rotates from the position of optical axis converting element 20a to 20b. Thus, the optical axis incident on the diverging element 30 rotates from the angle θpa to the angle θpb. The light passing through the diverging element 30 travels in the direction of the angle θpb at the divergence angle ωv.

As described above, using the angle θw of the light branching element 50, the relationship between the angle θe at which the center of the virtual image can be observed from the observation point, and the angle θp at which the light is emitted from the body, is given as θp=2×θe−θw. Assuming that the angle θw is fixed, the angle θpb for adjusting the angle θeb can be obtained from the equation. In order to adjust the angle θea to the angle θeb, the angle θpa is replaced by the angle θpb.

Further, when the angle θpa is changed to the angle θpb, as shown in the figure, the incident position of the light branching element 50 is also changed from 50oa to 50ob. Thus, the observation point is also changed from the observation point 60a to the observation point 60b. Assuming that the divergence angle ωv of the diverging element 30 is constant, the position of the observation range Dv moves according to the change of the observation point.

As described above, it is possible to change the observation range Dv and the angle θe at which the virtual image can be observed, by rotating the optical axis converting element 20. According to the present embodiment, it is possible to adjust the observation range Dv and the angle θe by the rotation of the optical axis converting element 20, according to the user condition.

Here, the optical axis converting element 20 also has the effect of downsizing the body 100. The details will be described below.

It is also possible to change the angle θp by varying the angle of the image projection device 10, instead of the optical axis converting element 20.

The image projection device 10 projects an image at a predetermined angle of view. In order to obtain an image at a predetermined size by the diverging element 30, it is necessarily to provide a predetermined optical path length between the image projection device 10 and the diverging element 30. If the angle of the image projection device 10 is changed, the change in the position of the image on the diverging element 30 increases, requiring the diverging element 30 to increase in size. With the increase in the size of the diverging element 30, the size of the body 100 also increases.

On the other hand, in the present embodiment, the angle θp is adjusted by the rotation of the optical axis converting element 20, so that the change in the position of the image on the diverging element 30 is small. Thus, the size of the diverging element 30 is reduced, and the effect of downsizing the body 100 can be obtained.

Further, it is also possible to adjust the incident angle of the image light for forming a real image in the image projection device 10, into the direction of the light branching element 50 by adjusting the bending direction of the optical axis of the optical axis converting element 20. In particular, when a beam scanning type projection device is applied to the image projection device 10, the incident angle of the beam varies depending on the surface direction of the image forming surface. Thus, a brightness distribution occurs. The bending direction of the optical axis of the optical axis converting element 20 is set to compensate the change in the incident angle within the plane. In this way, it is possible to eliminate the brightness distribution in the image forming surface and increase the illumination efficiency.

Second Embodiment

Next, an example of the structure using a reflection type diverging element 33, instead of the diverging element 30 of the first embodiment, will be described. The same components as those in the first embodiment are designated by the same reference numerals, and the detailed description thereof will be omitted.

Figure 13:
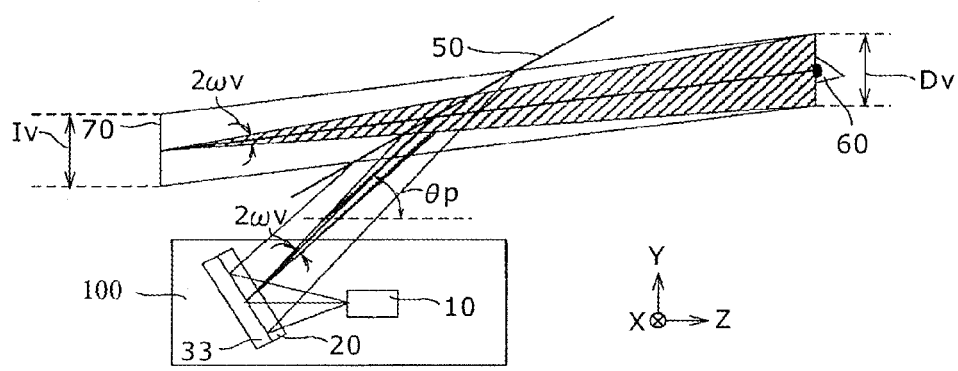
FIG. 13 is a view of the structure of a virtual image display device according to a second embodiment.

FIG. 13 is a view of the structure of a virtual image display device according to a second embodiment. In the virtual image display device according to the second embodiment, the light projected from the image projection device 10 is irradiated on the optical axis converting element 20, to convert the direction of the optical axis. Then, the light is reflected in the direction of the light branching element 50 by the reflection type convergent element 33.

Also, the structure of the second embodiment is such that the rotation of the optical axis converting element 20 around the x axis can change the angle θe at which the virtual image 70 can be observed, as well as the position of the observation range Dv. Thus, the observation range can be adjusted. At this time, similarly to the first embodiment, the adjustment may be made by rotating the optical axis converting element 20 solely, or by rotating the optical axis converting element 20 together with the reflection type diverging element 33.

Third Embodiment

Figure 14:
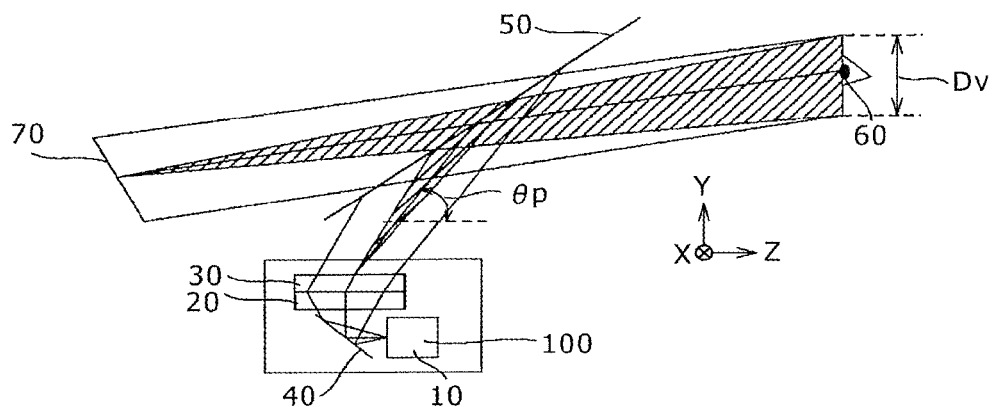
FIG. 14 is a view of the structure of a virtual image display device according to a third embodiment.

Next, FIG. 14 shows an example of the virtual image display device in which a bend mirror 40 is inserted between the image projection device 10 and the optical axis converting element 20. The same components as those of the first embodiment are designated by the same reference numerals, and the description thereof will be omitted.

In this example, it is possible not only to adjust the angle θp by the rotation of the optical axis converting element 20, but also to adjust the angle θp by the rotation of the bend mirror 40.

Further, the bend mirror 40 has a shape of a concave surface or a free curved surface, and may have a function of correcting the angle of view of the light projected from the image projection device 10, to a greater value.

Fourth Embodiment

Figure 15:
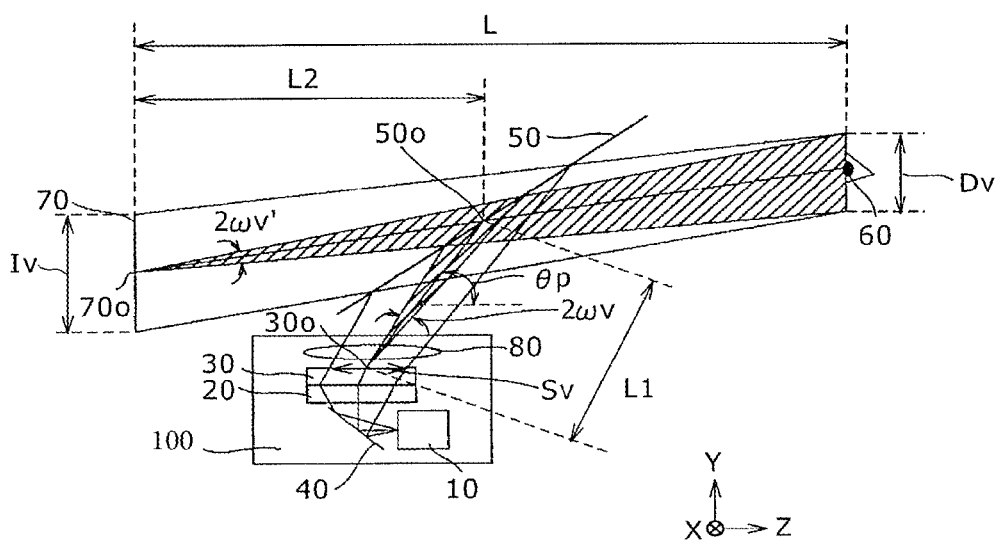
FIG. 15 is a view of the structure of a virtual image display device according to a fourth embodiment.

Next, FIG. 15 shows an example of the virtual image display device in which a lens 80 is inserted between the image projection device 10 and the optical axis converting element 20. The same components of the first embodiment are designated by the same reference numerals, and the detailed description thereof will be omitted.

More specifically, in FIG. 15, the distance between the points 30o and 50o is L1, the distance between the points 50o and 70o is L2, and the focal distance of the lens is f. Using the distance L1 and the focal distance f, the relationship for the distance L2 is given as $1/L2=1/L1+1/f$. Using the lateral magnification obtained by the ratio of the distance L1 and the distance L2, the relationship between the image size Sv on the diverging element 30 and the size Iv of the virtual image 70 is given as $Iv=Sv\times M$. Thus, it is possible to adjust the distance L2 of the virtual image and the size Sv by adjusting the focal distance f of the lens 80.

The relationship between the divergence angle $\omega v$ of the diverging element 30 and the divergence angle $\omega v'$ of the virtual image 70 is obtained, using the magnification M, as follows: $\omega v = \omega v' \times M$. From the figure, it can be found that the divergence angle $\omega v'$ is expressed, using the observation range Dv and the distance L between the observation point 60 and the virtual image 70, as follows: $\omega v' = \tan^{-1}(Dv/2/L)$. Thus, in order to obtain the predetermined observation range Dv, the divergence angle of the diverging element 30 is adjusted to at least $\omega v \leq M \times \tan^{-1}(Dv/2/L)$.

Similarly, although not shown, the divergence angle $\omega h$ with respect to the x direction is given as $\omega h \leq M \times \tan^{-1}(Dh/2/L)$, using a predetermined observation range Dh, the distance L, and the lateral magnification M.

Note that the lens 80 is not included in the display element according to the third embodiment, which can be considered as the form of the lateral magnification M=1 according to the fourth embodiment.

Fifth Embodiment

Figure 16:
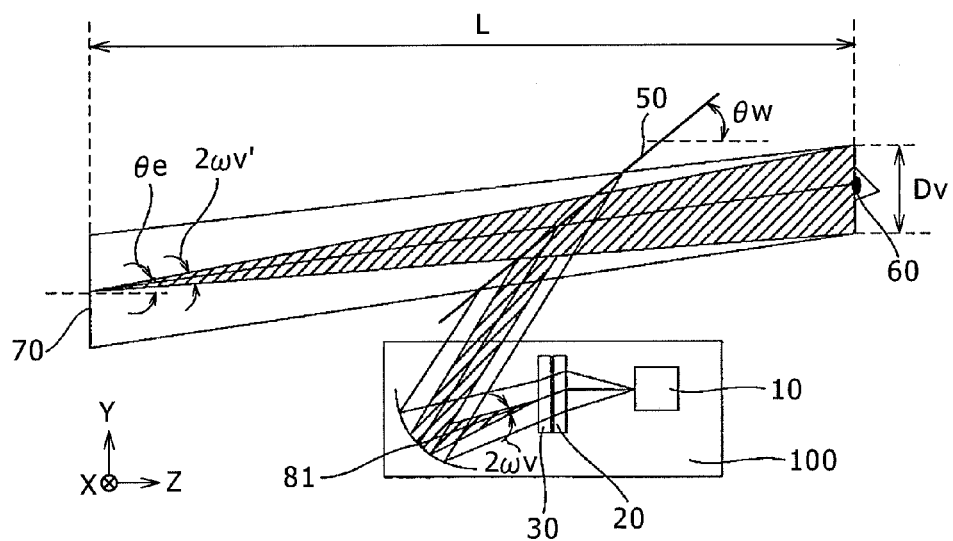
FIG. 16 is a view of the structure of a virtual image display device according to a fifth embodiment.

A fifth embodiment will be described. FIG. 16 is a view of the structure of a display device according to the fifth embodiment. In the fifth embodiment, a concave mirror 81 is provided between the light branching element 50 and the diverging element 30 in the display device according to the first embodiment. The other components are the same as those of the first embodiment and designated by the same reference numerals, and the detailed description thereof will be described.

In the case of installing the concave mirror 81, similar to the lens 80 according to the fourth embodiment, it is possible to adjust the size of the virtual image 70 and the distance L2 by adjusting the focal distance f of the concave mirror 81. Further, using the observation range Dv, the lateral magnification M, and the distance L, the divergence angle $\omega v$ of the diverging element 30 in the direction perpendicular to the paper is expressed as $\omega v = M \times \tan^{-1}(Dv/2/L)$. Although not shown in the figure, the divergence angle $\omega h$ of the diverging element 30 in the direction parallel to the paper is also expressed as $\omega h = M \times \tan^{-1}(Dh/2/L)$, using the observation range Dh, the lateral magnification M, and the distance L.

When the virtual image display according to the present embodiment is applied to the in-car system, the light branching element 50 corresponds to the windshield of the car. At this time, the angle $\theta w$ of the light branching element 50 may vary locally depending on the light incident position. The local displacement of the light branching element 50 from the angle $\theta w$ is defined as the angle $\Delta \theta N$. The concave mirror 81 may have a shape of a free curved surface, so that the angle at which the virtual image 70 can be observed from the observation point 60 is the predetermined angle $\theta v$, even if the light branching element 50 has the local displacement angle $\Delta \theta w$.

Sixth Embodiment

Figure 17:
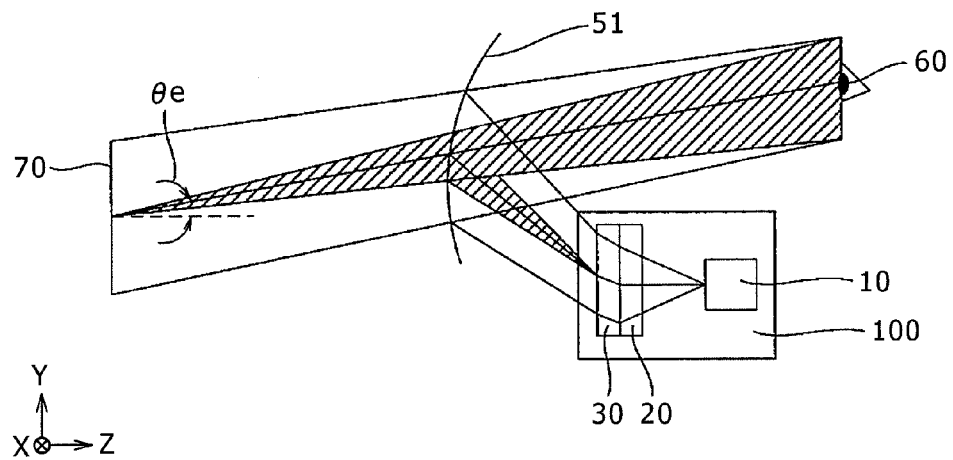
FIG. 17 is a view of the structure of a virtual image display device according to a sixth embodiment.

This embodiment is an example of the case providing a semi-transmissive concave mirror 51 as the light branching element with a function of both the light branching element 50 and the concave mirror 81, instead of those in the display device according to the fifth embodiment. The structure of the sixth embodiment is shown in FIG. 17.

As described above, it is enough that the display device according to the present invention includes the image projection device 10, the optical axis converting element 20, the diverging element 30, and the light branching element 50. There is no problem if a mirror or a diffraction grating is placed in the middle of the optical path to separate the optical path.

Further, it is enough that the angle of the light incident on the light branching element 50 is the angle $\theta p$. There is no problem if two or more angle converting elements are inserted before and after the diverging element 30.

What is claimed is:

1. A virtual image display device comprising:
   an image projection device that projects an image light;
   a bend mirror that bends the optical axis of the image light emitted from the image projection device;
   an optical axis converting element that converts the optical axis of the image light reflected from the bend mirror into a predetermined direction;
   a diverging element on which the image light emitted from the optical axis converting element is incident, spreading the image light out over a range of a predetermined angle;
   a lens that enlarges and emits the image light emitted from the diverging element in a direction; and
   a light branching element that reflects the image light emitted from the lens, while transmitting incident light from a surface other than the a reflecting surface thereof,
   wherein the image light from the image projection device is formed into an image on the diverging element, and
   wherein a virtual image of the image formed on the diverging element is generated on an extension line in an opposite direction of an emission direction of the image light reflected from the light branching element.

2. A virtual image display device according to claim 1,
   wherein the optical axis converting element is provided to be rotatable in a direction perpendicular to the emission direction, and
   wherein a position of an observation range of the virtual image is changed by changing the direction of the image light emitted from the diverging element.

3. A virtual image display device according to claim 2,
   wherein the optical axis converting element is a prism, a prism plate, a holographic element, a lens, or a mirror.

4. A virtual image display device according to claim 1,
   wherein an angle from a predetermined horizontal axis of a line connecting the virtual image and an observation point is defined as $\theta e$,
   wherein an angle from a horizontal axis of the light branching element is defined as $\theta w$,
   wherein an angle from a horizontal axis of the light emitted from the diverging element is defined as $\theta p$, and
   wherein a relationship of the angles $\theta e$, $\theta w$, and $\theta p$ is expressed as $\theta p = 2 \times \theta w - \theta e$.

5. A virtual image display device according to claim 1,
   wherein the diverging element spreads the image light out at different angles of a divergence angle in a predetermined first direction and a divergence angle in a second direction perpendicular to the first direction, and
   wherein the optical axis converting element converts the direction of the optical axis into the first direction.

6. A virtual image display device according to claim 1,
   wherein a range where the virtual image can be observed is defined as an observation range,
   wherein a distance from an observation point to the virtual image is defined as L,
   wherein a magnification of the lens for the image light is defined as M,
   wherein a size of the observation range in a vertical direction is defined as Dv, and a size of the observation range in the horizontal direction is defined as Dh,
   wherein a divergence angle of the diverging element in the vertical direction is defined as $\omega v$, and a divergence angle of the diverging element in the horizontal direction is defined as $\omega h$, and wherein the observation range satisfies the relationships of $\omega v <= M \times \tan^{-1}(Dv/2/L)$ and $\omega h <= M \times \tan^{-1}(Dh/2/L)$.

7. A virtual image display device comprising:
an image projection device that projects an image light;
an optical axis converting element that converts the optical axis of the image light emitted from the image projection device into a predetermined direction;
a diverging element on which the image light emitted from the optical axis converting element is incident, spreading the image light out over a range of a predetermined angle;
a concave mirror that reflects the image light emitted from the diverging element in a direction; and
a light branching element that reflects the image light emitted from the concave mirror, while transmitting incident light from a surface other than a reflecting surface thereof,
wherein the image light from the image projection device is formed into an image on the diverging element, and
wherein a virtual image of the image formed on the diverging element is generated on an extension line in an opposite direction to an emission direction of the image light reflected from the light branching element.

8. A virtual image display device according to claim 7,
wherein the optical axis converting element is provided to be rotatable in a direction perpendicular to the emission direction, and
wherein a position of an observation range of the virtual image is changed by changing the direction of the image light emitted from the diverging element.

9. A virtual image display device according to claim 8,
wherein the optical axis converting element is a prism, a prism plate, a holographic element, a lens, or a mirror.

10. A virtual image display device according to claim 7,
wherein an angle from a predetermined horizontal axis of a line connecting the virtual image and an observation point is defined as $\theta e$,
wherein an angle from a horizontal axis of the light branching element is defined as $\theta w$,
wherein an angle from a horizontal axis of the light emitted from the diverging element is defined as $\theta p$, and
wherein a relationship of the angles $\theta e$, $\theta w$, and $\theta p$ is expressed as $\theta p = 2 \times \theta w - \theta e$.

11. A virtual image display device according to claim 7,
wherein the diverging element spreads the image light out at different angles of a divergence angle in a predetermined first direction and a divergence angle in a second direction perpendicular to the first direction, and
wherein the optical axis converting element converts the direction of the optical axis into the first direction.

12. A virtual image display device according to claim 7,
wherein a range where the virtual image can be observed is defined as an observation range,
wherein a distance from an observation point to the virtual image is defined as L,
wherein a magnification of the concave mirror for the image light is defined as M,
wherein a size of the observation range in a vertical direction is defined as Dv, and a size of the observation range in a horizontal direction is defined as Dh,
wherein a divergence angle of the diverging element in the vertical direction is defined as $\omega w$, and a divergence angle of the diverging element in the horizontal direction is defined as $\omega h$, and
wherein the observation range satisfies the relationships of $\omega v <= M \times \tan^{-1}(Dv/2/L)$ and $\omega h <= M \times \tan^{-1}(Dh/2/L)$.

13. A virtual image display device comprising:
an image projection device that projects an image light;
an optical axis converting element that converts the optical axis of the image light emitted from the image projection device into a predetermined direction;
a diverging element on which the image light emitted from the optical axis converting element is incident, spreading the image light out over a range of a predetermined angle; and
a semi-transmissive concave mirror that reflects the image light emitted from the diverging element in a direction by a concave surface, while transmitting incident light from a surface other than the concave surface,
wherein the image light from the image projection device is formed into an image on the diverging element, and
wherein a virtual image of the image formed on the diverging element is generated on an extension line in an opposite direction to an emission direction of the image light reflected from the semi-transmissive concave mirror.

14. A virtual image display device according to claim 13,
wherein the optical axis converting element is provided to be rotatable in a direction perpendicular to the emission direction, and
wherein a position of an observation range of the virtual image is changed by changing the direction of the image light emitted from the diverging element.

15. A virtual image display device according to claim 14,
wherein the optical axis converting element is a prism, a prism plate, a holographic element, a lens, or a mirror.

16. A virtual image display device according to claim 13,
wherein an angle from a predetermined horizontal axis of a line connecting the virtual image and an observation point is defined as $\theta e$,
wherein an angle from a horizontal axis of the light branching element is defined as $\theta w$,
wherein an angle from a horizontal axis of the light emitted from the diverging element is defined as $\theta p$, and
wherein a relationship of the angles $\theta e$, $\theta w$, and $\theta p$ is expressed as $\theta p = 2 \times \theta w - \theta e$.

17. A virtual image display device according to claim 13,
wherein the diverging element spreads the image light out at different angles of a divergence angle in a predetermined first direction and a divergence angle in a second direction perpendicular to the first direction, and
wherein the optical axis converting element converts the direction of the optical axis into the first direction.

18. A virtual image display device according to claim 13,
wherein a range where the virtual image can be observed is defined as an observation range,
wherein a distance from an observation point to the virtual image is defined as L,
wherein a magnification of the semi-transmissive concave mirror for the image light is defined as M,
wherein a size of the observation range in a vertical direction is defined as Dv, and a size of the observation range in a horizontal direction is defined as Dh,
wherein a divergence angle of the diverging element in the vertical direction is defined as $\omega v$, and a divergence angle of the diverging element in the horizontal direction is defined as $\omega h$, and
wherein the observation range satisfies the relationships of $\omega v <= M \times \tan^{-1}(Dv/2/L)$ and $\omega h <= M \times \tan^{-1}(Dh/2/L)$.

* * * * *